United States Patent
Nylén et al.

(10) Patent No.: US 12,428,530 B2
(45) Date of Patent: Sep. 30, 2025

(54) METHOD OF MAKING A CELLULOSE FILM COMPRISING MICROFIBRILLATED CELLULOSE

(71) Applicant: Stora Enso OYJ, Helsinki (FI)

(72) Inventors: Otto Nylén, Helsinki (FI); Isto Heiskanen, Imatra (FI); Isabel Knöös, Säffle (SE)

(73) Assignee: Stora Enso OYJ, Helsinki (FI)

( * ) Notice: Subject to any disclaimer, the term of this patent is extended or adjusted under 35 U.S.C. 154(b) by 503 days.

(21) Appl. No.: 17/757,256

(22) PCT Filed: Dec. 22, 2020

(86) PCT No.: PCT/IB2020/062324
§ 371 (c)(1),
(2) Date: Jun. 13, 2022

(87) PCT Pub. No.: WO2021/130668
PCT Pub. Date: Jul. 1, 2021

(65) Prior Publication Data
US 2023/0002572 A1 Jan. 5, 2023

(30) Foreign Application Priority Data
Dec. 23, 2019 (SE) .................................. 1951556-8

(51) Int. Cl.
| | | |
|---|---|---|
| *C08J 5/18* | (2006.01) | |
| *B32B 7/06* | (2019.01) | |
| *D21H 11/18* | (2006.01) | |
| *D21H 17/25* | (2006.01) | |
| *D21H 17/36* | (2006.01) | |
| *D21H 23/28* | (2006.01) | |

(52) U.S. Cl.
CPC ....................... *C08J 5/18* (2013.01); *B32B 7/06* (2013.01); *D21H 11/18* (2013.01); *D21H 17/25* (2013.01); *D21H 17/36* (2013.01); *D21H 23/28* (2013.01); *C08J 2301/02* (2013.01)

(58) Field of Classification Search
CPC ......... C08J 5/18; C08J 2301/02; D21H 11/18; D21H 17/25; D21H 17/36; D21H 23/28; B32B 7/06
See application file for complete search history.

(56) References Cited

U.S. PATENT DOCUMENTS

| | | | | |
|---|---|---|---|---|
| 3,189,503 A | * | 6/1965 | Bergstein | ............... D21H 19/60 156/231 |
| 5,658,374 A | | 8/1997 | Glover | |
| 2010/0113319 A1 | | 5/2010 | Gerusz et al. | |
| 2013/0048238 A1 | | 2/2013 | Glover et al. | |
| 2014/0127413 A1 | | 5/2014 | McGuire et al. | |
| 2019/0062998 A1 | | 2/2019 | Chen et al. | |
| 2020/0023409 A1 | | 1/2020 | Axrup et al. | |
| 2020/0031092 A1 | * | 1/2020 | Walker, Jr. | ................ B32B 5/22 |

FOREIGN PATENT DOCUMENTS

| | | | | |
|---|---|---|---|---|
| CN | 101724501 A | | 6/2010 | |
| CN | 102146313 A | | 8/2011 | |
| CN | 102504924 A | * | 6/2012 | |
| CN | 109021473 A | | 12/2018 | |
| CN | 110139960 A | | 8/2019 | |
| CN | 110268007 A | | 9/2019 | |
| CN | 110330769 A | * | 10/2019 | ............. C08B 15/02 |
| EP | 0046014 A1 | | 2/1982 | |
| JP | H11501343 A | | 2/1999 | |
| JP | 2017078151 A | | 4/2017 | |
| KR | 20190092877 A | | 8/2019 | |
| KR | 20190092974 A | * | 8/2019 | ............. B29C 55/02 |
| WO | 2011058086 A1 | | 5/2011 | |
| WO | 2011156313 A1 | | 12/2011 | |
| WO | 2012027253 A1 | | 3/2012 | |
| WO | 2014105798 A1 | | 7/2014 | |
| WO | 2018060868 A1 | | 4/2018 | |
| WO | 2018168393 A1 | | 9/2018 | |
| WO | 2019073370 A1 | | 4/2019 | |

OTHER PUBLICATIONS

CN 110330769 A English summary, Jul. 23, 2019. (Year: 2019).*
English machine translation of CN110330769A, Jul. 3, 2019. (Year: 2019).*
English Machine translation of CN102504924A, Jun. 20, 2012. (Year: 2012).*
English machine translation of KR20190092974A (Year: 2019).*
Extended European Search Report for corresponding European application No. EP20906373.4, dated Dec. 6, 2023.
Bajpai, Pratima, Pulp and paper industry chemicals 2015, ISBN 978-0-12-803408-8.
International Search Report from corresponding PCT application No. PCT/IB2020/062324 dated Feb. 23, 2021.
Vartiainen, Jari et al., Hydrophobization of cellophen and cellulose nanofibrils films by supercritical state carbon dioxide impregnation with walnut oil, Biorefinery, Nordic Pulp & Paper Research Journal, vol. 31, No. 4, 2016.

* cited by examiner

*Primary Examiner* — Anthony Calandra
(74) *Attorney, Agent, or Firm* — Greer, Burns & Crain, Ltd.

(57) ABSTRACT

A method for making a cellulose film comprising microfibrillated cellulose (MFC) is provided, said method comprising the step of: applying an aqueous emulsion of one or more vegetable oils to a surface of a casting substrate. Improved release of the MFC film can thus be achieved.

13 Claims, No Drawings

METHOD OF MAKING A CELLULOSE FILM COMPRISING MICROFIBRILLATED CELLULOSE

This application is a U.S. National Phase under 35 U.S.C. § 371 of International Application No. PCT/IB2020/062324, filed Dec. 22, 2020, which claims priority under 35 U.S.C. §§ 119 and 365 to Swedish Application No. 1951556-8 filed Dec. 23, 2019.

TECHNICAL FIELD

The present invention relates to a method for making a cellulose film comprising microfibrillated cellulose (MFC). An MFC film is also provided.

BACKGROUND

It is favourable to use hydrophilic film-forming polymers such as polyvinyl alcohol to enhance the barrier properties and reinforcement of cellulose films. In particular, such additives are useful for films of microfibrillated cellulose (MFC), where inter-fiber bonding is weak due to the fineness of the MFC.

One problem which occurs in cellulose film manufacture when casting on a substrate is the very high degree of adhesion between the film and the substrate that such components can impart. Even at very low dosages, the film-forming polymer can create such high adhesion that the cellulose film cannot be separated from the casting substrate when dry. Solutions to this problem include brushing or washing the cellulose film from the casting substrate. However, such solutions are less effective in continuous production processes, where machine speed is high and the cellulose film needs to be separated from the casting substrate in a precise and controlled manner.

It is known in the optical film and plastic film industries to use release agents based on fluoropolymers, silanes, silanols, or siloxanes to separate plastic films from casting substrates. Such release agents are often toxic and therefore unsuitable for production of films intended for e.g. food contact.

There remains a need for an improvement in the release of cellulose films comprising MFC from the casting substrate.

SUMMARY

So, in a first aspect a method for making a cellulose film comprising microfibrillated cellulose (MFC) is provided, said method comprising the steps of:
a. providing a casting substrate having at least one surface;
b. applying an aqueous emulsion of one or more vegetable oils to said surface of said casting substrate;
c. casting a film-forming composition on the treated surface of said casting substrate, said film-forming composition comprising MFC and a hydrophilic film-forming polymer;
d. drying the film-forming composition on the casting substrate to form a cellulose film comprising microfibrillated cellulose (MFC); and
e. separating the formed cellulose film from the casting substrate.

The use of a release agent is also provided, said release agent being an aqueous emulsion of one or more vegetable oils, in promoting the release of a cellulose film comprising MFC and a hydrophilic film-forming polymer from a surface of a casting substrate.

Furthermore, a cellulose film is provided which comprises microfibrillated cellulose (MFC) and a hydrophilic film-forming polymer, said cellulose film defining a surface, wherein at least one vegetable oil is present on said surface.

Further details of the invention are apparent from the following description and dependent claims.

DETAILED DISCLOSURE

It has been found that a significant improvement in the release of cellulose films containing MFC and a hydrophilic film-forming polymer from the casting substrate can be achieved by applying a thin layer of release agent being at least one vegetable oil on a surface of the casting substrate prior to MFC film formation on said surface. Such a release agent enables separation of neat, undamaged MFC film containing film-forming polymer from the surface of the casting substrate. In particular, this type of release agent may be substantially non-toxic, and can be added during continuous production and gives a rapid response in the release properties, enabling precise control of film adhesion and release, without influencing the properties of the MFC film itself (e.g. oxygen barrier properties).

In particular, even low doses of vegetable oil release agent may provide a significant improvement in release. This is important, as certain chemicals may function as a "debonder", and application at low doses is therefore useful.

The vegetable oils used in the present invention may be approved for direct food contact according to the "GRAS" designation from the FDA or may comply with BfR recommendation XXXVI. The vegetable oils may be edible.

The use of the release agents of the present invention enables the adjustment of adhesion of an MFC film to the casting substrate in a controllable manner.

A method for making a cellulose film comprising microfibrillated cellulose (MFC) is provided; i.e. an MFC film. The method comprising the general steps of:
a. providing a casting substrate having at least one surface;
b. applying an aqueous emulsion of one or more vegetable oils to said surface of said casting substrate;
c. casting a film-forming composition on the treated surface of said casting substrate, said film-forming composition comprising MFC and a hydrophilic film-forming polymer;
d. drying the film-forming composition on the casting substrate to form a cellulose film comprising microfibrillated cellulose (MFC); and
e. separating the formed cellulose film from the casting substrate.

One advantage of MFC films is that they can be transparent to visible light. Preferably, therefore, the MFC film has a transparency of more than 50% preferably more than 65% and more preferably more than 75% when measured for a film with grammage of ca 30 gsm using the standard DIN 53147. Note that the MFC film can have high transparency for visible light but poor transparency for UV light.

The MFC film described herein can provide increased barrier at least against one of grease/oil, moisture, oxygen or aroma. The MFC film suitably has an Oxygen Transmission Rate (OTR) value less than 5000 cc/m$^2$/24 h (23° C., 50% RH) according to ASTM D-3985 at a grammage between 10-50 gsm, more preferably in the range of 100-1000 cc/m²/24 h. The OTR may also be lower than 100 cc/m²/24 h, such as 0.1-100 cc/m²/24 h under these conditions.

Furthermore, at least 60%, more preferably at least 70% or most preferably at least 80% of the tensile strength (index) of the MFC film made according to the invention may be maintained compared to a reference MFC film of the same composition, made without using the release agents of the invention. This is particularly relevant when the release agent is applied in low amounts and thereby does not affect the tensile strength of the film.

Casting Substrate

The method requires a casting substrate having at least one surface. The casting substrate can be any such substrate commonly used for casting fibrous suspensions. The substrate may be formed from plastic or metal, or combinations thereof. In one embodiment, where the method is continuous, the casting substrate is a belt, such as a metal belt.

The surface upon which the MFC film (film-forming composition) is cast may be substantially planar, or may be textured, or may have regions which are textured and other regions which are substantially planar. The surface may have openings for draining liquid from the film-forming composition.

The surface (e.g. belt) upon which the film-forming composition is cast may have a length of 1-300 m and a width of 0.2-10 m. The surface might also be coated with e.g. a ceramic or plastic coating e.g. to adjust surface energy.

If the surface is textured, it may contain recesses or protruding areas in a random or predetermined pattern. For example, a pattern of recesses can be created in the textured surface by etching non-conducting or conducting channels. It is also possible to deposit material to create protruding areas. One example is to use laser technology for engraving the textured surface.

In one embodiment, where the casting substrate is a metal belt, the surface can have ground or polished finish to provide smooth film surface. For very smooth film surface, mirror quality polished metal belt can be used. A metal belt can also have a polymer coating, such as a PTFE coating.

Release Agent

An aqueous emulsion of one or more vegetable oils is applied to the surface of said casting substrate. As mentioned above, the use of such a vegetable oil enables separation of neat, undamaged MFC film containing film-forming polymer from the surface of the casting substrate.

Release agents based on vegetable oils are used in the tissue paper industry, in modifying Yankee cylinder surface properties for good creping of the tissue base paper, see e.g. "Pulp and paper industry chemicals" by Pratima Bajpai (2015, ISBN 978-0-12-803408-8) and WO2011156313A1. However, creping is a different process to casting, and tissue paper generally does not comprise MFC fibres. Such release agents are not normally used in casting processes or cellulosic films comprising MFC.

Suitably, the emulsion is applied to the surface of said casting substrate such that the one or more vegetable oils are coated at a level of 0.1-500 mg/m², preferably 0.5-150 mg/m². The aqueous emulsion may comprise a low amount of vegetable oils, such as 0.01-20 wt %, preferably 0.01-10 wt %, more preferably 0.1-5 wt % of said one or more vegetable oils, while still providing good release from the casting substrate.

The one or more vegetable oils may be selected from ben oil, palm oil, palm kernel oil, canola oil, coconut oil, soybean oil, sunflower oil, rapeseed oil, peanut oil, cottonseed oil, olive oil, linseed oil, corn oil, safflower oil, walnut oil, sesame oil, almond oil, castor oil, colza oil, false flax oil, hemp oil, mustard oil, radish oil, ramtil oil, rice bran oil, tung oil, salicornia oil, jatropha oil or algae-based oil.

The aqueous emulsion of one or more vegetable oils should be of sufficiently low viscosity so that it can be sprayed or otherwise spread on the surface. The aqueous emulsion of vegetable oils suitably has a viscosity of less than 1000 mPas, preferably less than 500 mPas, when measured according to DIN 53015 at 20° C.

The aqueous emulsion may contain stabilizers or emulsifiers. The emulsifier may be selected from a non-ionic, cationic or anionic emulsifier. The average particle size in the emulsion is 10-1000 nm or preferably 20-400 nm.

Film-Forming Composition

The film-forming composition of the invention comprises MFC and a hydrophilic film-forming polymer. The composition is typically an aqueous suspension of MFC, in which the hydrophilic film-forming polymer is dissolved. Preferably the film-forming composition is an aqueous composition comprising 10-99 wt % MFC, preferably 50-99 wt % MFC, more preferably 70-95 wt % MFC based on the total solids content of the film-forming composition.

The viscosity of the film-forming composition should be more than 500 cP, preferably more than 1000 cP when measured with Brookfield viscosimeter at 100 rpm at 20° C.

Microfibillated Cellulose (MFC)

The present invention provides a cellulose film comprising microfibrillated cellulose (MFC). MFC shall in the context of the present technology mean a nano-scale cellulose fiber or fibril with at least one dimension, preferably diameter, less than 1000 nm. An MFC suspension might also comprise partly or totally non-fibrillated cellulose or lignocellulose fibers. The cellulose fiber is preferably fibrillated to such an extent that the final specific surface area of the formed MFC is from about 1 to about 500 m²/g, such as from 10 to 300 m²/g or more preferably 50-200 m²/g when determined for a solvent exchanged and freeze-dried material with the BET method. The mean average fibril diameter of the MFC is 1-1000 nm, preferably 10-1000 nm. The MFC may be characterised by analysing high resolution SEM or ESEM images.

Preferably, the MFC content in the MFC film is at least 10 wt %, preferably 50 wt %, more preferably at least 60 wt % and most preferably at least 70 wt % based on the total solids content. In an embodiment, the MFC film comprises at most 50 wt %, such as at most 30 wt %, suitably at most 20 wt %, based on the total solids content, of partly or totally non-fibrillated cellulose or lignocellulose fibers, having a mean average fibril diameter greater than 1000 nm.

Various methods exist to make MFC, such as single or multiple pass refining, pre-hydrolysis followed by refining or high shear disintegration or liberation of fibrils. One or several pre-treatment steps are usually required in order to make MFC manufacturing both energy-efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl, aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

The MFC may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single—or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC can be produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper, i.e. pre and post-consumer waste.

The MFC can be native (i.e. chemically unmodified), or it can be chemically modified. Phosphorylated MFC is typically obtained by reacting cellulose fibers soaked in a solution of $NH_4H_2PO_4$, water and urea and subsequently fibrillating the fibers. One particular method involves providing a suspension of cellulose pulp fibers in water, and phosphorylating the cellulose pulp fibers in said water suspension with a phosphorylating agent, followed by fibrillation with methods common in the art. Suitable phosphorylating agents include phosphoric acid, phosphorus pentaoxide, phosphorus oxychloride, diammonium hydrogen phosphate and sodium dihydrogen phosphate.

The film may also include other cellulosic components.

Hydrophilic Film-Forming Polymer

The film-forming composition comprises a hydrophilic film-forming polymer. The polymer assists in bonding the MFC fibres of the film together. The film-forming composition typically comprises 0.1-50 wt %, preferably 0.1-25 wt %, more preferably 0.1-15 wt % of said film-forming polymer based on the total solids content of the film-forming composition. The term "hydrophilic" means that—when in solid form—the polymer has a contact angle with water being less than 90 degrees, preferably less than 70 degrees.

Suitably, the film-forming polymer is selected from polyvinyl alcohol (PVA), cellulose derivatives, polyacrylamide, polyethylene imine, acrylic polymers and polyethylene glycol (PEG). Preferred film-forming polymers are polyethylene glycol (PEG) and polyvinyl alcohol (PVA).

Partly- or fully-hydrolysed derivatives of these film-forming polymers are also potentially used. The degree of hydrolysis can be from 85-99%.

The film-forming polymers—in particular the PVA—can also be derivatised with various functional groups such as e.g. silanols or carboxylic acids.

Cellulose derivatives used as the film-forming polymer include methyl cellulose, hydroxypropyl cellulose, hydroxyethyl cellulose, ethyl hydroxyethyl cellulose, sodium carboxymethyl cellulose (NaCMC) or carboxymethyl cellulose (CMC). Cellulose derivatives may also include starch or hemicellulose, or derivatives thereof.

The film-forming composition may comprise one hydrophilic film-forming polymer or two or more hydrophilic film-forming polymers. In one embodiment, each hydrophilic film-forming polymer may be selected from polyvinyl alcohol (PVA), cellulose derivatives, polyacrylamide, polyethylene imine, acrylic polymers and polyethylene glycol (PEG), and partly- or fully-hydrolysed derivatives thereof.

Film Formation

The film-forming composition described above is cast on the treated surface of said casting substrate. Casting may take place at a speed of 10 to 500 m/min, preferably 20 to 300 m/min. The film forming composition may have a temperature of 10 to 90° C., preferably 20 to 70° C., more preferably from 20 to 60° C.

The film-forming composition is dried on the casting substrate to form a cellulose film comprising microfibrillated cellulose (MFC). In the drying step, drying and optionally dewatering takes place. Drying can be done by means of evaporation, where the drying method can be impingement drying, contact drying, infrared drying, steam drying, combination of these or any other method known for a person skilled in art. During the drying temperature of the film-forming composition may be less than 90° C., preferably less than 80° C. A separate dewatering step can also be included, either immediately after casting or after casting and drying of film to certain dryness. Dewatering can be done by means of press dewatering, capillary dewatering, filtration or gravitational dewatering. For example, a dewatering step can be followed by evaporation drying. The aim of the drying step and optional dewatering step is to reach end dryness of the cellulose film of 75-99%, more preferably 80-97%.

The formed cellulose film is then separated from the casting substrate.

The method of the present invention may comprise additional conversion steps carried out on the cellulose film, such as e.g. printing, coating, laminating etc. One additional step may be rinsing the cellulose film to remove excess aqueous emulsion from the cellulose film. Any amount of vegetable oil remaining on the MFC film may be very small, but may be detectable by means of UV or UV-Vis spectroscopy. The vegetable oil may be used as a tracing chemical and/or chemical fingerprint, due to its characteristic UV spectrum.

Other Components

The film-forming composition used in the present method and the resulting cellulose film may comprise one or more additional components.

In one aspect, the film-forming composition comprises 0.1-30 wt %, preferably 0.1-25 wt %, more preferably 0.1-15 wt % of a filler, preferably a mineral filler such as e.g. clay, based on the total solids content of the film-forming composition. Typical fillers can be nanoclays, bentonite, silica or silicates, calcium carbonate, talcum, etc. Preferably, at least one part of the filler is a platy filler. Preferably, one dimension of the filler should have an average thickness or length of 1 nm to 10 µm. If determining the particle size distribution of fillers for example with light scattering techniques, the preferred particle size should be that more than 90% is below 2 µm. Other fillers may be selected from layered silicates, metal oxides, carbon nanotubes and metal nanoparticles.

Furthermore, the film-forming composition may further comprise one or more stabilising agents or plasticizers. In one particular aspect, the plasticizer is a C1-C24 polyalcohol, preferably a C1-C12 polyalcohol, more preferably a C1-C6 polyalcohol such as sorbitol. The film forming composition may comprise 1-40 wt % based on the total solids content of the film-forming composition, preferably 3-20% of such plasticizer. In one aspect, the film-forming composition does not comprise vegetable oils.

The film-forming composition may also contain strengthening agents such as cellulose derivatives or native starch or modified starch such as, for example, cationic starch, nonionic starch, anionic starch or amphoteric starch. In a further embodiment, the film-forming composition may also contain retention and drainage chemicals. In yet a further embodiment, the film-forming composition may also contain other typical process or performance chemicals such as dyes or fluorescent whitening agents, defoamers, wet strength resins, biocides, hydrophobic agents, barrier chemicals, plasticizers, humectants, etc.

In one embodiment, the aqueous emulsion of one or more vegetable oils may provide an adhesion between the cellulose film and the casting substrate of between 0.5 and 5 N/m.

Generally, the invention also provides the use of an aqueous emulsion of one or more vegetable oils, in promoting the release of a cellulose film comprising MFC and a hydrophilic film-forming polymer from a surface of a casting substrate.

Also provided is a cellulose film comprising microfibrillated cellulose (MFC) and a hydrophilic film-forming polymer, said cellulose film defining a surface, wherein at least one vegetable oil is present on said surface. The cellulose film provided herein typically has a grammage of 10-60 gsm when dry. All details provided above with regard to the method of the invention are also applicable to the cellulose film itself, as far as possible.

Preferably, the cellulose film defined herein has a 75-99% solids content, most preferably 80-97% at the point at which it is separated from the casting substrate.

The cellulose film can be utilized, for example, as packaging material for food, electronic or cosmetic products.

The film may also comprise polymers such as water-soluble polymers and natural gums.

Water soluble polymers can be e.g. polyvinyl alcohol, while natural gums can be e.g. guar gum, cellulose derivatives, hemicelluloses, and other polysaccharides.

EXAMPLES

Example 1 (Comparative)

A film comprising microfibrillated cellulose, polyvinyl alcohol and bentonite was cast formed on a moving steel belt so as to obtain a wet film thickness of 740 μm following dewatering and drying. The steel belt had a PTFE coating, Ra roughness of 0.9 μm and surface energy of 40-42 mN/m.

The solids content of the suspension used to make the film was 4.24 wt-%, containing 95.76 wt-% of water, 3.69 wt-% of microfibrillated cellulose, 0.37 wt-% of polyvinyl alcohol and 0.18 wt-% of bentonite.

The film was dried to a final solids content of above 95 wt-% and an attempt was done to separate the film from the steel belt and carry it over to a reeler as a free-standing film to make a continuous film reel.

The adhesion between the film and the steel belt was so high that the film could not be separated from the steel belt and the machine had to be stopped.

Example 2

The MFC film recipe as given in Example 1 was cast formed but now with the exception that the belt was treated by an emulsion to control the adhesion to the belt.

An aqueous emulsion of rapeseed oil was prepared by using lecithin as emulsifier. 6 g of soy lecithin was first dispersed in 100 g of rapeseed oil in a kitchen blender, after which 1000 g of water was added and the emulsion mixed until it was visibly homogeneous. The emulsion was then diluted with water to reach the final concentration of 2 wt-% of rapeseed oil.

The same cast forming conditions and steel belt as in Example 1 was used, whereas here the emulsion was sprayed with atomizing nozzles on the top surface of the moving steel belt at a rate of 82 g/min before feeding the MFC suspension to the steel belt. The belt was moving at a speed of 4.8 m$^2$/min. 35 g/min of the emulsion was recovered from the belt surface with a rubber scraper that continuously scrapes the belt surface to remove the excess water and emulsion. 17 g/min was recovered from the casing and surfaces around the spraying area. Therefore 30 g/min was the amount of emulsion that remained on the steel belt surface, corresponding to 6.25 g/m$^2$. Considering the vegetable oil concentration of 2 wt-%, rapeseed oil amount on the steel belt was therefore 125 mg/m$^2$.

In this case, the dry film could be easily separated from the steel belt substrate and a free-standing film reeled to make continuous film reel. The 125 mg/m$^2$ effective dosage of rapeseed oil in emulsion form was efficient, whereas some residual emulsion was left on the surface of the dry film and steel belt, respectively.

Example 3

The same MFC composition was prepared as in Example 2 whereas the rapeseed oil concentration in the emulsion was reduced to 0.2 wt-%.

Also 12.5 g/m$^2$ dosage provided successful release of essentially dry film from the steel belt surface, and a continuous free-standing film could be reeled. With lower dosage of rapeseed oil emulsion, the film and steel belt surface were showing less residual from the emulsion.

Example 4 (Comparative)

The experiment was also repeated with a film comprising microfibrillated cellulose, polyvinyl alcohol, bentonite and polyethylene glycol. The wet film was cast on a moving steel belt so as to obtain a wet film thickness of 690 μm following dewatering and drying. A steel belt as in Example 1 was used. The suspension contained 95.66 wt-% of water, 3.62 wt-% of MFC, 0.36 wt-% of polyvinyl alcohol, 0.18 wt-% of bentonite and 0.18 wt-% of polyethylene glycol, amounting to total solids content of 4.34 wt-%.

Without spray application of rapeseed oil emulsion before film casting the adhesion was again too high to remove the film from the steel belt after drying.

Example 5

The same film composition, the same cast forming conditions and the same steel belt as in Example 4 were used, but now with belt treated with rapeseed oil emulsion. The rapeseed oil emulsion was sprayed in a dosage corresponding to an effective rapeseed oil amount of 125 mg/m$^2$. The positive effect of the treatment of the belt was obvious and detachment of MFC film could be made without problems.

Example 6

The same film composition, the same cast forming conditions and the same steel belt as in Example 4 were used, but now with belt treated with rapeseed oil emulsion. The rapeseed oil emulsion was sprayed in a dosage corresponding to an effective rapeseed oil amount of 12.5 mg/m$^2$. The positive effect of the treatment of the belt was obvious and detachment of MFC film could be made without problems.

TABLE 1

| Example No. | | 1 | 2 | 3 | 4 | 5 | 6 |
|---|---|---|---|---|---|---|---|
| Suspension | | | | | | | |
| Water | wt-% | 95.76 | 95.76 | 95.76 | 95.66 | 95.66 | 95.66 |
| MFC | wt-% | 3.69 | 3.69 | 3.69 | 3.62 | 3.62 | 3.62 |
| PVOH | wt-% | 0.37 | 0.37 | 0.37 | 0.36 | 0.36 | 0.36 |
| Bentonite | wt-% | 0.18 | 0.18 | 0.18 | 0.18 | 0.18 | 0.18 |
| PEG | wt-% | | | | 0.18 | 0.18 | 0.18 |
| Emulsion | | | | | | | |
| Rapeseed oil | wt-% | | 2 | 0.2 | | 2 | 0.2 |
| Soy Lecithin | wt-% | | 0.120 | 0.012 | | 0.120 | 0.012 |
| Water | wt-% | | 97.88 | 99.79 | | 97.88 | 99.79 |
| Steel belt | | | | | | | |
| Speed | m²/min | 4.8 | 4.8 | 4.8 | 4.8 | 4.8 | 4.8 |
| Emulsion amount | g/m² | | 6.25 | 6.25 | | 6.25 | 6.25 |
| Rapeseed oil | mg/m² | | 125 | 12.5 | | 125 | 12.5 |
| Adhesion | high/low | high | low | low | high | low | low |
| Reeling | yes/no | no | yes | yes | no | yes | yes |

Adhesion is evaluated from the trial by following film or web release from the steel belt after the drying section before transferring to the reeling. Web adhesion can also be monitored by on-line imaging the web release behavior or by e.g. spectroscopic means to analyse the residual on the metal belt. The reeling is evaluated by following the quality of reels such as tension, reel dimensions etc. Uneven or too high web adhesion might cause problem with web tension and subsequently reel quality. Too high web adhesion will also lead to web breaks or similar defects.

Although the present invention has been described in relation to a number of embodiments, these are not to be considered limiting for the invention. The skilled person may provide other embodiments falling within the claims by combining various aspects and embodiments as required.

The invention claimed is:

1. A method for making a cellulose film comprising microfibrillated cellulose (MFC), said method comprising the steps of:
   a. providing a casting substrate having at least one surface;
   b. applying an aqueous emulsion of one or more vegetable oils to said surface of said casting substrate to provide a treated surface;
   c. casting a film-forming composition on the treated surface of said casting substrate, said film-forming composition comprising MFC and a hydrophilic film-forming polymer, wherein said film-forming composition comprises 0.1-50 wt % of said hydrophilic film-forming polymer based on a total solids content of the film-forming composition, and wherein said hydrophilic film-forming polymer is selected from a group consisting of: polyvinyl alcohol (PVA), polyethylene glycol (PEG), and partly- or fully-hydrolysed derivatives thereof;
   d. drying the film-forming composition on the casting substrate to form the cellulose film comprising microfibrillated cellulose (MFC); and
   e. separating the cellulose film from the casting substrate.

2. The method according to claim 1, wherein said film-forming composition is an aqueous composition comprising 10-99 wt % MFC based on a total solids content of the film-forming composition.

3. The method according to claim 1, wherein said film-forming composition further comprises between 0.1-30 wt % of a filler based on a total solids content of the film-forming composition.

4. The method according to claim 1, wherein said cellulose film has a dry grammage of 10-60 gsm.

5. The method according to claim 1, wherein the one or more vegetable oils are applied to said surface of said casting substrate at a level of 0.1-500 mg/m².

6. The method according to claim 1, wherein said aqueous emulsion comprises 0.01-20 wt % of said one or more vegetable oils.

7. The method according to claim 1, wherein the one or more vegetable oils are selected from a group consisting of: ben oil, palm oil, palm kernel oil, canola oil, coconut oil, soybean oil, sunflower oil, rapeseed oil, peanut oil, cottonseed oil, olive oil, linseed oil, corn oil, safflower oil, walnut oil, sesame oil, almond oil, castor oil, colza oil, false flax oil, hemp oil, mustard oil, radish oil, ramtil oil, rice bran oil, tung oil, salicornia oil, jatropha oil and, algae-based oil.

8. The method according to claim 1, wherein the film-forming composition further comprises a stabilising agent, or a plasticizer, or a combination thereof.

9. The method according to claim 8, wherein the plasticizer is a C1-C24 polyalcohol.

10. The method according to claim 3, wherein the filler is selected from a group consisting of layered silicates, metal oxides, carbon nanotubes, and metal nanoparticles.

11. The method according to claim 1, wherein the aqueous emulsion comprises an emulsifier.

12. The method according to claim 11, wherein the emulsifier is selected from a group consisting of an nonionic emulsifier, a cationic emulsifier, and an anionic emulsifier.

13. The method according to claim 1, wherein the cellulose film has a 75-99% solids content when the cellulose film is separated from the casting substrate.

* * * * *